Nov. 23, 1965 R. H. JAKOB 3,219,722
CYCLIC CRYSTALLIZATION PROCESS
Filed Dec. 5, 1961
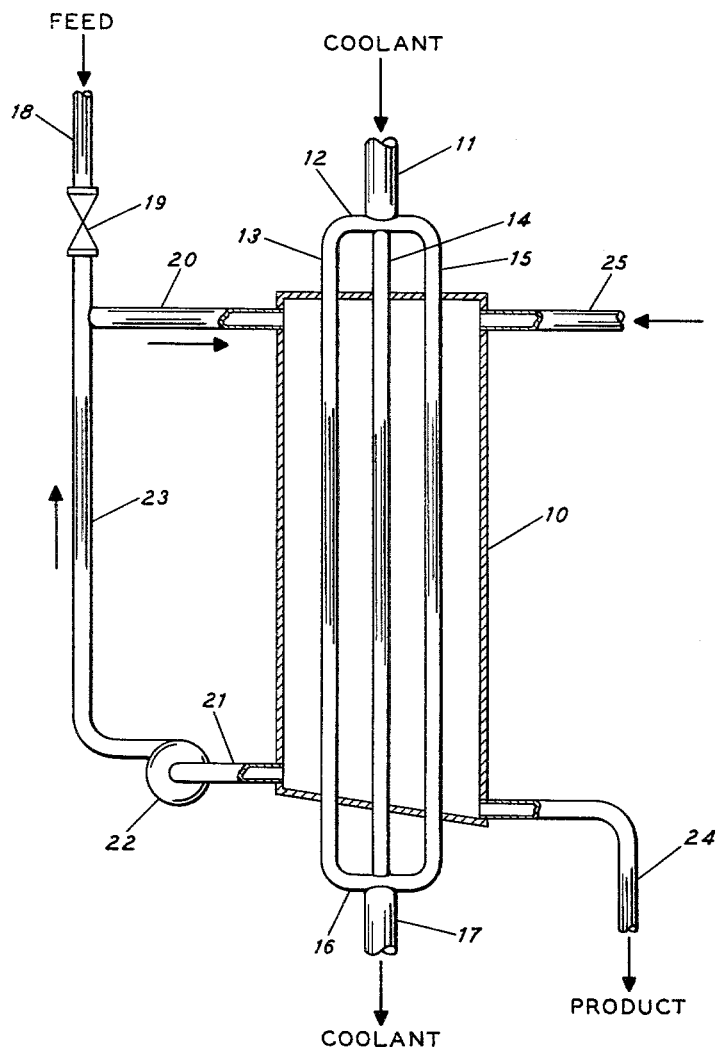
INVENTOR
ROBERT H. JAKOB
BY
ATTORNEYS ়
United States Patent Office 3,219,722
Patented Nov. 23, 1965

3,219,722
CYCLIC CRYSTALLIZATION PROCESS
Robert H. Jakob, Mill Valley, Calif., assignor to Chevron Research Company, a corporation of Delaware
Filed Dec. 5, 1961, Ser. No. 157,074
1 Claim. (Cl. 260—674)

This invention relates to the separation and purification of liquid multi-component mixtures by fractional crystallization. More particularly, it relates to a cyclic crystallization process that is especially suited for separating or concentrating paraxylene from at least one other xylene isomer.

In the chemical industries, fractional crystallization processes have found many uses. Often situations arise where separation by distillation, solvent extraction, or the like, are impracticable or impossible and the desired separation can only be carried out by fractional crystallization. A particular situation exists in the case of the separation of the isomeric xylenes. At the present time, there exists a large commerical market for high purity paraxylene. A large proportion of this market involves the conversion of paraxylene to dimethyl terephthalate which, in turn, is used to prepare polyethylene terephthalate polymers useful as synthetic fibers and films. Additionally, paraxylene can be oxidized to terephthalic acid which can be converted, by esterification with methanol, to dimethyl terephthalate. In such conversions the higher the purity of the paraxylene, the higher will be the purity of the dimethyl terephthalate or terephthalic acid. Accordingly, it would be extremely desirable to have recourse to a process for recovering paraxylene from xylene-containing stocks wherein high yields of paraxylene can be attained having a purity in excess of 95%, and preferably above 98%. Such a process is disclosed herein.

In addition to the production of high purity crystallizable compounds, the present invention also is applicable to the concentration of such compounds in what may be considered dilute streams. For example, again using a paraxylene-containing stream for purposes of description, a refinery stream containing a relatively low paraxylene content of from 5 to 30 percetnt can be employed as the feed to the subject cyclic process. The process can readily concentrate the paraxylene to produce a product having in excess of 75% paraxylene. In this way, dilute streams produced in remote areas can be easily concentrated for transmission to other areas where additional processing facilities are located.

The present invention provides for crystallizing crystallizable components from a liquid, multi-component feedstock by a cyclic process which comprises the following sequence of steps.

A. The cycle is initiated by passing the feedstock into a vessel containing an indirect heat exchange means comprising at least one conduit passing through the vessel but not open thereto.

B. The flow of feedstock is discontinued when at least a major portion of the heat exchange means is immersed in the liquid feedstock.

C. A coolant is then passed through said heat exchange means for a time sufficient such that the feedstock is adjusted to a temperature below the freezing point of the crystallizable component.

D. The coolant is passed through the indirect heat exchange means for a time sufficient for crystals to form on the exterior surfaces of the heat exchange means located within the vessel.

E. The flow of coolant is discontinued while substantially all of the remaining liquid is drained from the vessel.

F. The crystals are thetn melted.

G. The vessel is then drained, thereby recovering the liquid product.

H. The cycle is again initiated by passing additional feedstock into the vessel.

As noted, the crystallization process of the present invention is applicable to separation of particular crystallizable components from simple, binary and complex multi-component systems. Specifically, the cyclic process of the present invention can be employed in the separation of multi-component systems containing xylenes, cyclohexane, normal paraffins, benzene, and the like. Because of its commercial importance, the invention is specifically directed to the recovery of paraxylene and, because of this importance, the process will be described herein with respect to such a separation.

With the specific application for the separation of paraxylene in mind, a suitable feedstock for producing high purity paraxylene may be any mixture consisting of xylene isomers and having a paraxylene content greater than that necessary to form a eutectic mixture with the other xylenes or other compounds associated with the feed. Coke oven distillates having xylene contents of 75% or higher are suitable feeds, as are xylene-rich fraction separated from catalytically reformed naphthenes.

In the petroleum industry, straight-run naphthenic distillates boiling in the range of from about 180° to 340° F. are reformed over various catalysts at relatively high temperatures in the presence of hydrogen to increase the aromatic content of the distillates. The product of such a process can be fractionally distilled to separate a fraction boiling in the range of about 275° to 300° F. and having a $C_8$ aromatic content of 50 to 60 percent, which is particularly suited as a feed to the present process.

More preferably, the feedstocks of the present invention are those xylene-containing hydrocarbon fractions that have been solvent-extracted, as by $SO_2$, aqueous glycol solutions and the like, to produce a feedstock having a $C_8$ aromatic content of 95% and above. Also preferred feedstocks are the relatively high purity paraxylene streams recovered from single and multistage crystallizers having paraxylene contents up to 95% or even higher.

As noted, the process can also be used for the concentration of crystallizable compounds present in dilute feedstocks. Accordingly, feedstocks containing upwardly of about 5% of the desired crystallizable compounds are also within the scope of the present invention.

The invention can best be described in conjunction with the accompanying figure, which shows a simplified process system for practicing the invention. Much conventional apparatus such as subsidiary valves, pumps, etc., are not shown but can be readily supplied by one skilled in the art.

Referring to the figure, the basic apparatus consists of a vessel 10 containing an indirect heat exchange means. The apparatus includes a coolant inlet line 11, an inlet header 12, the indirect heat exchange means which comprises coolant conduits (tubes) 13, 14 and 15 insidet of vessel 10, coolant outlet header 16 and coolant outlet line 17. The purpose of the indirect heat exchange means (conduits 13, 14 and 15) is to indirectly cool the liquid feedstock in the vessel 10 and to provide cold surfaces upon which crystals can form. Obviously, conventional tube heat exchangers with a plurality of tube passes could be used and are within the scope of the present invention The cyclic process of the present invention is initiated by passing the feedstock into vessel 10 by line 18, through valve 19 and line 20. Enough feed is passed into vessel 10 to immerse the major proportion of conduits 13, 14 and 15. The flow of feedstock is then discontinued by closing valve 19. Preferably, the liquid feedstock in vessel 10 is maintained in an agitated state. This can be done by continuously circulating the feedstock by line 21, pump 22, line 23 and line 20. This circulation is conducted at a flow rate such that turbulent flow occurs within vessel 10.

The coolant is then passed into coolant inlet line 11, preferably during the time the feed is being passed into vessel 10. The coolant can be any fluid medium that will provide the necessary cooling of the feedstock. Representative coolants are precooled fluids such as brine, mother liquor, methanol, etc., or evaporative coolants such as the Freons, propane, ammonia, etc.

The coolant passes through line 11, header 12, into conduits 13, 14 and 15, thereby cooling, by indirect heat exchange, the feedstock in vessel 10. The coolant leaves by outlet header 16 and outlet line 17. Of course, the coolant leaving line 17 can be recooled to the desired temperature and recycled back into line 11.

The temperature of the coolant is, of course, a function of the temperature necessary to effect crystallization of the crystallizable component, or components, in the feedstock present in vessel 10. In the specific case of a process employed to recover or concentrate only paraxylene from at least one other xylene isomer, the coolant composition, temperature and flow rate should be adjusted such that the temperature at the point of crystallization is in the range of from about 30° F to just above the eutectic point of paraxylene and the other isomer or isomers in the feed. When paraxylene is being separated from a feedstock containing paraxylene and metaxylene, the feedstock should not be cooled below the paraxylene-metaxylene eutectic point; otherwise, both paraxylene and metaxylene crystals would form on conduits 13, 14 and 15, a result obviously to be avoided. Generally the crystallization temperature will be maintained within the range of from about 30° F. to −120° F., and preferably from about 20° F. to −100° F.

A preferred method of conducting the cooling step is by programmed cooling. Such a cooling operation contemplates starting the cooling at a relatively high temperature and gradually or periodically reducing the temperature of the coolant and, thus, the exterior surfaces of the indirect heat exchange means. For an example of periodic programmed cooling, the coolant is first passed through the conduits so as to regulate the temperature at about 20° F. After a specific contact time, say 20 or 30 minutes, the coolant temperature can be decreased, thereby reducing the conduit surface temperature to about zero or below for a specific contact period. This periodic programmed reduction in temperature can be continued until the desired crystal formation occus. The purpose of such a programmed cooling is to prevent shock chilling whereby liquid could be trapped in the crystal lattices, thereby decreasing the concentration of the final product.

Programmed cooling can also be done by gradually reducing the temperature of the coolant at a relatively constant rate. Thus, for example, the coolant temperature can be reduced at a rate of from about 0.1° to about 10° F. per minute. Such a gradual programmed cooling will also prevent shock chilling with attendant entrapment of mother liquor in the crystal cake.

The chilled exteriors of conduits 13, 14 and 15 will cause the formation of crystals thereon. The thickness of the crystal cake will, of course, depend upon the temperature and the contact time. After formation of the crystal cake, the cycle comprises discontinuing the flow of coolant through conduits 13, 14 and 15, and draining the remaining liquid from vessel 10, now reduced with respect to its paraxylene content. The crystal cake is then melted and removed as a product from line 24. The cake can be melted either indirectly by passing a warm fluid medium through the previously described cooling system of inlet line 11, header 12, conduits 13, 14 and 15, outlet header 16 and outlet line 17, or directly by contacting the crystals with a warm fluid medium that can be passed into vessel 10 by lines 18 and 20. Preferably, the melting step is accomplished by contacting the crystals with product recovered from line 24 in a previous cycle. In this preferred operation, a portion of the product from a previous cycle, which has been recovered by line 24 and which has been stored (in a manner not shown), is passed into vessel 10 by line 25. By operating the process in this manner, the concentration of the desired product is constantly built up until the desired high degree of purity and/or concentration is attained.

Even more preferably, the present process can be conducted such that, after draining the mother liquor from the vessel 10 and before removal of the cake from the exteriors of the conduits, the cake is contacted with a wash medium to remove mother liquor (but without substantial melting) that has been retained on the surface of the cake. Suitable wash media include, for example, paraxylene product or methanol, preferably in the vapor phase. Inert gases can also be employed. Following this washing operation, the cake is then melted as previously described.

After recovery of the product, the cycle is again initiated by passing feed into the vessel as described above.

The following examples will demonstrate the utility and advantages of the present process.

*Examples 1 to 13*

In these examples, the work was carried out in a 2-inch inside-diameter vessel containing a single copper conduit having an inside diameter of ½-inch. The cycle was initiated by submerging substantially all of the exterior surface of the conduit within the vessel with the feedstock. The coolant (methanol and acetone were actually used) was then passed at a temperature of −40° F. through the inside of the conduit. The crystals were allowed to form on the exterior of the conduit (about 90 minutes' contact time) and after a cake of about ½-inch in thickness was formed, the liquid (mother liquor) was drained from the vessel. The crystals were then melted and recovered as a product. Variations on this cyclic procedure are described below. In all cases, the feed was composed of paraxylene along with at least one other xylene isomer. All of the individual runs of the examples are summarized on the accompanying Table I.

When programmed cooling was employed, the coolant was first passed through the tube at 23° F. for 20 to 30 minutes. The temperature of the coolant was then dropped to −4° F. and passage through the tube was for 30 minutes. The coolant was then reduced to −40° F. and passed through the tube for 30 minutes.

The term "Product Wash" in Table I indicates that the crystals formed in the vessel were not appreciably melted by contact with a product recovered from a previous cycle and used as a liquid wash. In each such case, the product used to wash the newly-formed crystals was composed of 99.6% paraxylene and entered the vessel at 62°±2° F. The amount employed was such that the ratio of the weight of product to the weight of the crystal cake was 3.

In operations indicated in Table I to be under turbulent flow, the liquid (mother liquor) was recirculated by a pump from the bottom of the vessel to the top of the vessel such that turbulent flow existed within the vessel.

TABLE I

| Run No | 1 | 2 | 3 | 4 | 5 | 6 | 7 | 8 | 9 | 10 | 11 | 12 | 13 |
|---|---|---|---|---|---|---|---|---|---|---|---|---|---|
| Programmed Cooling | No | No | No | No | No | Yes | No | Yes | Yes | No | No | Yes | Yes |
| Product Wash | No | No | No | No | No | No | No | Yes | No | Yes | No | No | Yes |
| Turbulent Flow | No | No | No | No | No | No | No | No | No | No | No | Yes | No |
| Feed Composition, percent paraxylene | 98.3 | 86.2 | 98.3 | 86.0 | 86.1 | 86.2 | 86.1 | 82.4 | 82.9 | 79.7 | 81.3 | 91.0 | 88.4 |
| Product Composition, percent paraxylene | 99.9 | 95.6 | 99.5 | 96.0 | 94.3 | 98.3 | 94.1 | 98.2 | 93.6 | 97.3 | 9.54 | 99.3 | 97.5 |
| Mother Liquor Composition, percent paraxylene | 96.5 | 79.0 | 95.7 | 82.3 | 78.1 | 83.3 | 83.1 | 7.74 | 79.5 | 78.2 | 79.7 | 89.5 | 82.4 |
| Yield, percent of paraxylene in feed | 47 | 47 | 66 | 34 | 53 | 26 | 28 | 28 | 30 | 13 | 16 | 17 | 32 |

*Examples 14 to 16*

These examples show the application of the present process for the concentration of crystallizable components from dilute streams. The feedstock in these examples was a refinery stream containing 17 weight percent paraxylene, 45% metaxylene, 9% orthoxylene, 25% ethylbenzene, and 4% non-aromatic hydrocarbons. The runs were conducted in the equipment and in the manner described in the preceding examples. No product wash, programmed cooling, or turbulent flow in the vessel was employed. Yields were low due to heat leaks that developed in the apparatus. The maximum yield of paraxylene was fixed by the metaxylene-paraxylene eutectic at about 50%. Table II summarizes the results of these three separate runs.

TABLE II

| Run No | 14 | 15 | 16 |
|---|---|---|---|
| Coolant Temperature, °F | −100 | −95 | −100 |
| Product, percent paraxylene | 77.0 | 77.8 | 76.6 |
| Yield, percent of paraxylene in feed | 15 | 19 | 12 |

From Table II it can be seen that paraxylene was successfully concentrated to produce a product having a concentrate of about 77% paraxylene, a 4½-fold increase in concentration over the feedstock.

I claim:

A cyclic process for crystallizing paraxylene from a liquid feedstock containing paraxylene and at least one other xylene isomer, which comprises:

(a) passing said feedstock into a vessel containing an indirect heat exchange means comprising at least one conduit passing through said vessel but not open thereto;

(b) discontinuing the flow of said feedstock when at least a major portion of said heat exchange means is immersed in said liquid feedstock;

(c) maintaining said feedstock in said vessel in an agitated state throughout substantially all of the subsequent cooling step;

(d) passing a coolant through said heat exchange means for a time sufficient such that the feedstock is cooled to a temperature below about −30° F. but above the eutectic point of said feedstock, the temperature of said coolant being adjusted such that the feedstock is cooled at a rate of about 0.1° to 10° F. per minute;

(e) continuing passage of said coolant for a time sufficient for paraxylene crystals to form on the exterior surfaces of said heat exchange means within said vessel;

(f) discontinuing the flow of said coolant while draining substantially all of the mother liquor from said vessel;

(g) contacting said paraxylene crystals with a fluid wash medium to remove mother liquor therefrom, the washing step being conducted without substantial melting of said paraxylene crystals;

(h) melting said paraxylene crystals by direct contact with a warm, paraxylene-enriched product fluid passed into said vessel;

(i) draining said vessel and recovering the liquid product, at least a portion of which is used to melt paraxylene crystals in the next succeeding cycle; and (j) again passing the fresh feedstock into said vessel to initiate another cycle.

References Cited by the Examiner

UNITED STATES PATENTS

| | | | |
|---|---|---|---|
| 2,389,793 | 11/1945 | Livingston | 260—666 |
| 2,766,309 | 10/1956 | Speed et al. | 260—674 |
| 2,816,938 | 12/1957 | Hess | 260—666 |
| 2,854,494 | 9/1958 | Thomas | 260—674 |
| 2,884,470 | 4/1959 | Harrison et al. | 260—674 |
| 2,914,583 | 11/1959 | Walker | 260—674 |

ALPHONSO D. SULLIVAN, *Primary Examiner.*